INVENTOR.
JOHN F. BLUMENFELD

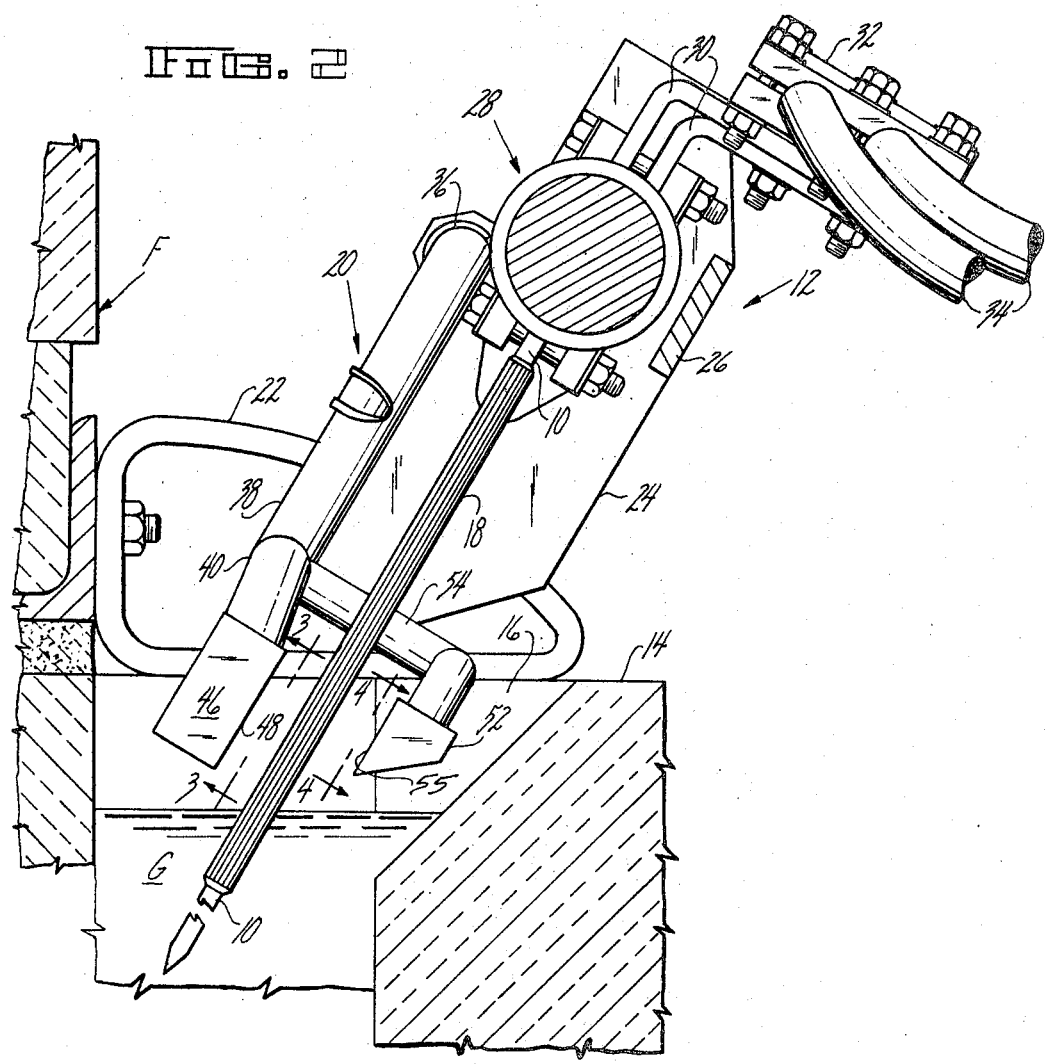

United States Patent Office
3,398,228
Patented Aug. 20, 1968

3,398,228
AIR STREAM DEVICE FOR COOLING
GLASS FURNACE ELECTRODES
John F. Blumenfeld, Simsbury, Conn., assignor to Emhart
Corporation, Bloomfield, Conn., a corporation of
Connecticut
Filed Jan. 6, 1967, Ser. No. 607,752
4 Claims. (Cl. 13—6)

ABSTRACT OF THE DISCLOSURE

A device for air cooling an electrode used for electrically heating the material contained in an all electric or electrically boosted glass furnace or the like. The device is associated with a portion of the electrode projecting outwardly from the molten material and it concentrates its cooling effect on a longitudinally extending zone of the electrode. The actual cooling is achieved by a relatively large number of jets of air being directed onto the surface of the electrode so as to produce a turbulent scrubbing action thereon which enhances the transfer of heat from the electrode.

BACKGROUND OF THE INVENTION

In furnaces which are heated by electric current passed between electrodes, the electrodes themselves become very hot, and it is desirable for various reasons to cool the outwardly projecting portions of the electrodes. For example, in electric glass making furnaces it is now a common practice to use molybdenum rods or bars for electrodes. On exposure to air, a molybdenum electrode rapidly oxidizes. This can be partially avoided by providing protective coating of a suitable material on the outer or exposed portions of the electrode, but since such coating is not entirely impervious to air, it is often desirable to provide some cooling means for even a protectively coated molybdenum electrode.

Heretofore, most electrode cooling systems and devices have involved the use of water as the cooling medium, the water being circulated through passages in the electrodes or through jackets surrounding them. While such water cooling methods have served a desired purpose, they are nonetheless subject to certain disadvantages including that of requiring a drainage system for disposing of the water. In attempting to overcome this disadvantage of water cooling, various air cooling devices have been tried, but they have achieved only limited use because they lack the desired efficiency.

SUMMARY OF THE INVENTION

It is the general object of this invention to provide an air stream device for cooling a furnace electrode which is capable of producing very adequate cooling with a reasonably low rate and quantity of air flow. In keeping with this object, an air conduit is provided which is connectible with a source of air under pressure and which has a discharge means comprising at least one housing defining a plenum chamber having a wall provided with a plurality of orifice openings. This housing is spaced from the electrode, and the orifice openings are so arranged in the housing wall facing the electrode that jets of air from the openings impinge on the electrode surface in a uniform pattern over a longitudinally extending zone of the electrode, and the jets create air turbulence and scrubbing action at the electrode surface which materially aids in the dissipation of heat therefrom.

BRIEF DESCRIPTION OF THE DRAWINGS

FIG. 2 is a vertical sectional view taken through a portion of the furnace and electrode holder as indicated generally by the line 2—2 of FIG. 1.

FIG. 3 is a view of one of the plenum chamber housings taken as indicated by the line 3—3 of FIG. 2.

FIG. 4 is a view of the other plenum chamber housing taken as indicated by the line 4—4 of FIG. 2.

DESCRIPTION OF THE PREFERRED EMBODIMENT

Figure 1:
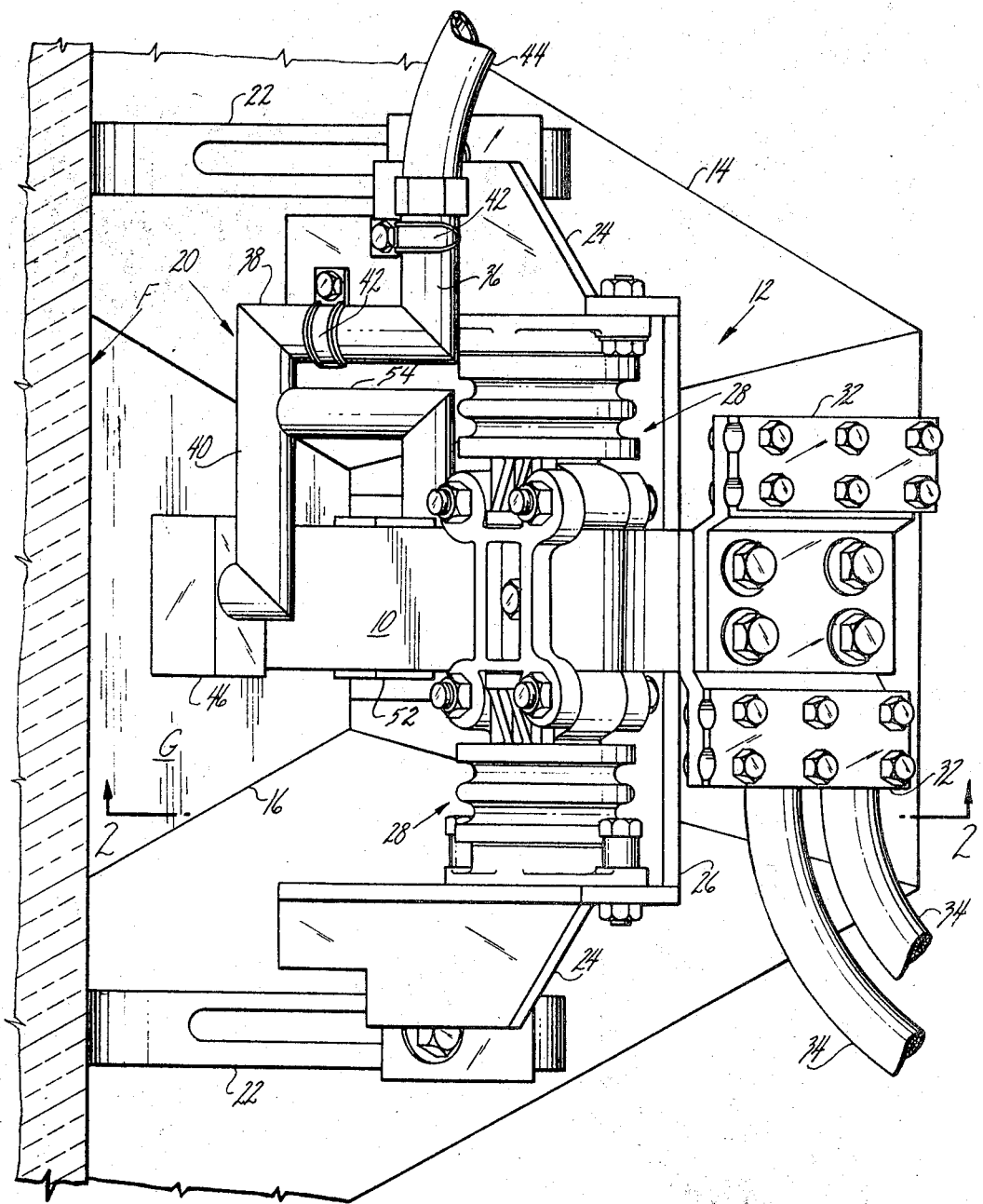
FIG. 1 is a plan view of an electrode holder having the cooling device of this invention secured thereto and mounted on a glass making furnace.

The presently preferred electrode 10 comprises a flat elongated molybdenum bar of generally rectangular cross sectional configuration. For purposes of illustration, the said electrode 10 is shown as supported in a holder structure 12 which is shown in detail and fully described in the co-pending application of John F. Blumenfeld and George F. Hanks, entitled, Electrode Holder for Glass Furnaces or the Like, Ser. No. 599,088, and filed Dec. 5, 1966. As shown and described in that application, the holder 12 is adjustably supported over an open bay 14 constructed at the side and near the top of a glass making furnace F so that the electrode 10 can be projected downwardly through the opening 16 in the bay with its lower end portion submerged in the molten glass G. As also described in that application, a substantial part of the outwardly projecting portion of the molybdenum electrode 10 is provided with a protective coating 18 of suitable material designed to prevent or to diminish oxidation of the electrode. The rate of oxidation of the electrode increases with its temperature, and the air stream cooling device 20 of this invention is provided to reduce the temperature of the unsubmerged portion of the electrode and thereby to reduce its rate of oxidation.

As described in the said co-pending application, the electrode holder 12 is mounted for angular adjustment on a pair of brackets 22, 22 which rest on the bay 14 and are secured to the adjacent side of the furnace F. This angular adjustment is such as to adjust the angle of inclination of the electrode 10 relative to the surface of the molten glass making material G.

The holder 12 includes a frame comprising a pair of angle members 24, 24 which straddle the bay opening 16 and are detachably and adjustably connected to the brackets 22, 22, respectively. The frame also includes a crossbar 26 extending between the angle members 24, 24 to provide rigidity for the frame structure.

In addition to the frame, the holder 12 includes clamp structure, indicated generally at 28 which is mounted on the frame and clamps the electrode 10 in place relative thereto. A pair of busbars 30, 30 are connected to the electrode 10 within the clamp structure 28 and extend outwardly therefrom to provide electrical connection at terminals 32, 32 with electrical conductors or conduits 34, 34 extending to a suitable power supply.

From the foregoing description, as can be more fully determined by reference to the said co-pending application, it will be understood that the angular disposition of the electrode 10 can be adjusted as it moves with its holder 12 on the brackets 22, 22, the pivot point of angular adjustment being below the surface of the glass G. The electrode and holder being adjustable, it is desirable that the electrode cooling device 20 be mounted for movement with the electrode and its holder in order that the same cooling effect can be achieved in all adjusted positions of the electrode.

The device 20 for cooling the electrode 10 comprises a jointed main metal conduit comprising angularly connected sections 36, 38 and 40. The first and second sections 36 and 38 are secured to one of the frame angle members 24 as by a pair of pipe support clamps 42, 42.

These clamps can be made adjustable so as to adjust the position of the cooling device 20 relative to the electrode 10, but they rigidly support the said device in any adjusted position. The first section 36 of the said main conduit is provided with a flexible connector 44 (which is preferably heat-resistant metal) for connection with a source of air under pressure. Such source may be the conventional source used as a supply of air for cooling the walls of the furnace F, or it may be a separate source.

The third section 40 of the main conduit of the cooling device 20 extends into position into spaced relationship between the electrode 10 and the adjacent wall of the furnace F. It will be seen that a generally rectangular housing 46 is connected to the open end of the third conduit section 40, and this housing defines a plenum chamber for the cooling air. It will also be seen that the housing 46 is of sufficient size to span the width of the electrode 10 and that one of its walls 48 faces the nearest surface of the electrode and is substantially parallel therewith. This wall 48 of the plenum chamber housing 46 is provided with a plurality of orifice openings 50, 50 which are arranged in a uniform pattern as best seen in FIG. 3. These orifice openings permit the air to issue from the plenum chamber in jets, the said wall being spaced from the electrode 10, so that the jet air streams strike the surface of the electrode in a longitudinal zone therealong. Air turbulence is thus created at the surface of the electrode within the said zone, and this turbulent air has a scrubbing effect on the surface and brings more air into contact with the surface thereby enhancing the dissipation of heat therefrom.

A second generally similar housing 52 is provided at the end of a branch conduit 54 extending from the main conduit section 40 to the opposite side of the electrode 10 from the housing 46. The housing 52 also defines a plenum chamber having a wall 55 which is substantially parallel to the electrode 10, and this wall has a plurality of orifice openings 56, 56 to issue air stream jets directed toward the electrode.

It will be seen that the plenum-defining housings 46, and 52 having apertured walls facing the electrode define a zone of exposure thereon for the cooling air. It will be seen in FIG. 2 that the two plenum-defining housings 46 and 52 are disposed relatively close to the surface of the glass G so that the cooling zone defined by the said housings is located in that portion of the unsubmerged part of the electrode where the heat is most intense, and this, of course, reduces the heat conducted upwardly along the electrode. Some of the air directed onto the electrode is reflected onto the surface of the glass G in the opening 16 of the bay 14. This tends to cause the surface to solidify and it provides an insulating thermal blanket which reduces heat loss from the glass in the bay opening.

It has been determined that the cooling device 20 arranged as shown, should provide adequate cooling with a relatively low rate of air flow. For example, in the cooling of an electrode approximately three inches (3″) wide and with a plenum housing 46 which is three inches (3″) wide having an arrangement of orifice openings as shown wherein each opening is three-thirty seconds of an inch (3/32), there being ten (10) such openings in all, and with a three inch (3″) wide plenum housing 52 having five similar orifice openings arranged as shown and wherein the respective plenum housings are spaced approximately one inch (1″) from the opposite sides of the electrode, fifteen (15) cubic feet per minute of air will be used at an orifice pressure of sixteen (16) ounces per square inch gage.

I claim:

1. An air stream device for cooling the outwardly projecting portion of a glass furnace electrode which has an inwardly projecting portion submerged in molten glass, said device comprising a conduit connectible with a source of air under pressure and having an air discharge means provided with a plurality of orifice openings arranged to direct jets of air onto the surface of such electrode, the orifice openings being spaced from the electrode and arranged relative to one another so that the jets of air they discharge are directed to the electrode in a generally uniform pattern distributed over a zone extending longitudinally of the electrode from a point on the electrode adjacent its inwardly projecting submerged portion, and a common support means for said electrode and said air discharge means, whereby adjustment of the support means will not affect the orientation of said air discharge means relative to said electrode.

2. An electrode cooling device as defined in claim 1 wherein said discharge means includes at least one housing defining a plenum chamber and having a wall facing the electrode and extending along the said zone thereof, and wherein the said orifice openings are provided in said wall.

3. An electrode cooling device as set forth in claim 2 which is particularly adapted for use with an electrode of rectangular cross section and wherein there are two such housings provided, each of which is connected with said conduit, the said housings being disposed on opposite sides of said electrode within the longitudinally extending zone thereon.

4. An electrode cooling device as defined in claim 3 wherein the electrode is supported in a holder which includes a frame movable on bracket means to change the angular disposition of the electrode relative to the furnace, and wherein said conduit includes means for effecting a flexible connection with the source of air under pressure, and clamp means are provided for securing the cooling device to said movable frame whereby to maintain the orientation of said housings and their orifices relative to said electrode, and particularly to the inwardly projecting submerged portion thereof, in angularly adjusted positions of the holder and electrode.

References Cited

UNITED STATES PATENTS

| | | | |
|---|---|---|---|
| 2,389,033 | 11/1945 | Dubsky | 13—17 |
| 2,693,498 | 11/1954 | Penberthy | 13—17 |
| 2,736,759 | 2/1956 | Penberthy | 13—6 X |
| 2,926,208 | 2/1960 | Eden | 13—6 |

BERNARD A. GILHEANY, *Primary Examiner.*

H. B. GILSON, *Assistant Examiner.*